UNITED STATES PATENT OFFICE.

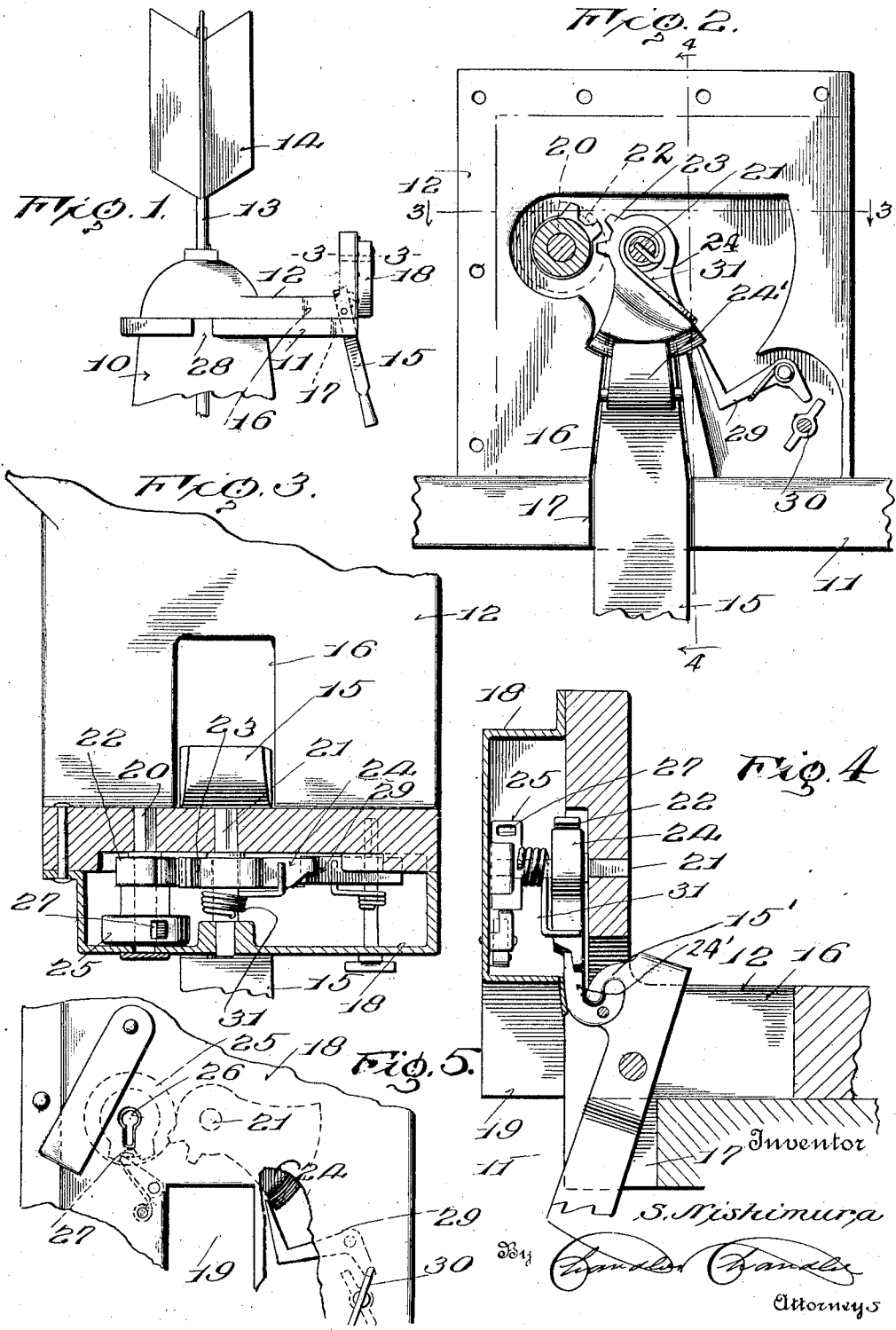

SHINZO NISHIMURA, OF WAPATO, WASHINGTON.

RAILWAY-SWITCH-STAND LOCK.

1,331,719.  Specification of Letters Patent.  Patented Feb. 24, 1920.

Application filed September 12, 1919. Serial No. 323,265.

*To all whom it may concern:*

Be it known that I, SHINZO NISHIMURA, residing at Wapato, in the county of Yakima, State of Washington, have invented certain new and useful Improvements in Railway-Switch-Stand Locks; and I do hereby declare the following to be a full, clear, and exact description of the invention, such as will enable others skilled in the art to which it appertains to make and use the same.

This invention relates to new and useful improvements in railway switch stand locks.

One object of the present invention is to provide a novel and improved lock which is simple and effective in its operation and which does away with the inconvenient padlock now used.

Another object is to provide a novel and improved lock for holding the switch lever or handle against accidental movement into or out of operative position.

A further object is to provide an improved device of this character wherein the key is required to unlock the switch lever to permit the same to be moved to throw the switch and also wherein the switch lever can be released and set back into locked position by an independent means.

Other objects and advantages will be apparent from the following description when taken in connection with the accompanying drawing.

In the drawing:

Figure 1 is an elevation of a switch stand showing the invention in side elevation.

Fig. 2 is a view looking toward the face of the lock, the front plate of the lock casing being removed.

Fig. 3 is an enlarged horizontal sectional view taken on the line 3—3 of Fig. 2.

Fig. 4 is a vertical sectional view taken on the line 4—4 of Fig. 2 but showing the front plate in place.

Fig. 5 is an enlarged fragmentary elevation of the front of the lock casing showing in dotted lines the unlocked position of the parts.

Referring particularly to the accompanying drawing, 10 represents the switch stand which includes the stationary horizontal disk member 11, the rotatable disk member disposed thereon, as shown at 12, said latter disk being keyed to the vertical shaft 13 of the stand which carries on its upper end the signal blades 14. Pivotally connected to the rotary disk is the switch lever 15. Mounted on the disk 12, adjacent the notches 16 and 17 of the disks 11 and 12, respectively, is a lock casing 18, see Figs. 3 and 4, the lower portions of the front and rear walls of which are formed with notches 19, into which the lever is adapted to be moved when the switch is to be thrown. Within the casing are disposed the two parallel shafts 20 and 21, and on the former of said shafts there is mounted a segmental pinion 22, the teeth of which are arranged to engage with the teeth 23 of the pivotal portion of the segmental blade 24, mounted on the shaft 21. This blade is adapted to swing into and out of position across the notches in the lower portions of the front and rear walls of the casing, as will be more clearly pointed out hereinafter. Carried by the outer end of the shaft 20 is a disk 25 in which is formed a key-hole opening 26 for the reception of a key (not shown) for opening the lock. When the shaft 20 is rotated the segmental pinion 22 will engage its teeth with the teeth of the segmental blade 24 whereby said blade will be turned upwardly out of its position across the notches 19.

Pivotally mounted in the casing below the blade 24 is a hook member 24', the inner end of which is arranged to engage with the lower end of the blade, as clearly seen in Fig. 4. This hook is interlocked with the hook 15' formed on the inner face of the upper end of the lever 15. When the blade 24 is swung toward one side, the hook 24' is free to move and will be swung on its pivot by the hook 15' of the lever, as the lever is moved toward horizontal position.

The switch lever can now be swung upwardly into a horizontal position and the switch thrown by swinging or moving the lever axially on the stand. A pivoted spring pressed pawl, mounted adjacent the peripheral edge of the disk 25 engages in a notch 27 in the said edge of the disk, see Fig. 5, whereby retrograde rotation of the disk is prevented, but continued movement of the disk, in the same direction permitted.

In the lower disk of the switch stand, at a point in its periphery ninety degrees from the notch 17, is a second notch 28, which is registered by the notch of the upper disk, when said upper disk is turned around in the throwing of the switch. Into this notch the switch lever drops, and is engaged from above by the segmental blade and the hook 24', which blade is released by the means now to be described.

In one side of the lower portion of the lock casing there is mounted a pivoted hook-shaped pawl 29 which engages with the lower corner of the blade 24 when said blade is swung upwardly and whereby said blade is thus held away from the notches 19 and the hook 24'. A key 30 is permanently mounted in this portion of the lock casing, said key being adapted, when turned, to engage with the pawl 29 and release the same from its engagement with the blade 24. A coil spring 31 is engaged around the shaft 21 and has one end secured to the blade and its other end secured to the shaft, the said shaft being immovable, whereby said blade will be restored to its normal position across the notches 19.

The disk 25 is so formed that when the key is inserted in the opening thereof and the disk and key turned to actuate the blade 24, said key cannot be removed until the disk has been turned completely through one revolution, thus placing the teeth of the pinion in engagement with the teeth of the blade at the upper end thereof. It will also be noted that the pinion 22 has only two teeth, and that the pivotal portion of the blade 24 has only two teeth. By this construction, when the key is turned to swing the blade into engagement with the pawl 29, the teeth of the pinion will move past the last tooth of the blade and thus be out of the way to permit the blade to swing back into normal position when the pawl 29 is released.

This device is especially useful when a train is to do shifting into and out of a siding, and where it is desirable to lock the switch in open position while the shifting is going on. With the devices now in use it requires the locking and unlocking of a padlock several times, whereas, in the present construction, after the trainman is done with the switch he restores it to closed position and then restores the lock to normal position by simply turning the permanent key in the lower corner of the lock casing.

What is claimed is:

1. In a locking device for the lever of a switch stand, the combination with the rotary portion of the stand and the lever thereof, of a lock casing mounted over the lever, means in the casing and releasable by a key for holding the lever against movement, and means in the casing and releasable by a permanent key for holding the lever holding means out of lever engaging position.

2. In a locking device for switch stands, the combination with the rotatable portion and lever of the stand, of a lock casing mounted on said rotatable portion and over the lever, said casing being formed with a notch to receive the lever in its switch throwing position, a movable member within the casing arranged to normally lie across the notch and above the lever to prevent upward movement of the lever, means operable by a key for swinging the movable member out of position above the lever, and a casing carried means for holding the movable member in inoperative position.

3. In a locking device for a switch stand, the combination with the rotatable portion of the stand and the pivoted lever carried thereby, of a lock casing mounted on the rotatable portion over the lever and having a notch for the operative movement of the lever into its horizontal position, a swingable member mounted in the casing and normally disposed in the upper portion of the notch over the lever to hold the lever against pivotal movement, a key operated means in the casing for swinging the said member out of lever holding position, a detent for holding the swingable member in inoperative position, and rotatable means carried by the casing for releasing said detent.

In testimony whereof, I affix my signature, in the presence of two witnesses.

SHINZO NISHIMURA.

Witnesses:
  HISAKICHI NISHI,
  ALFRED R. PEAKS.